Jan. 7, 1958 S. B. COHN 2,819,453
MICROWAVE FREQUENCY METER
Filed March 10, 1954
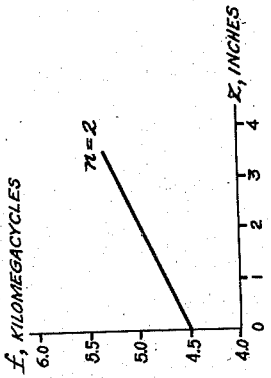
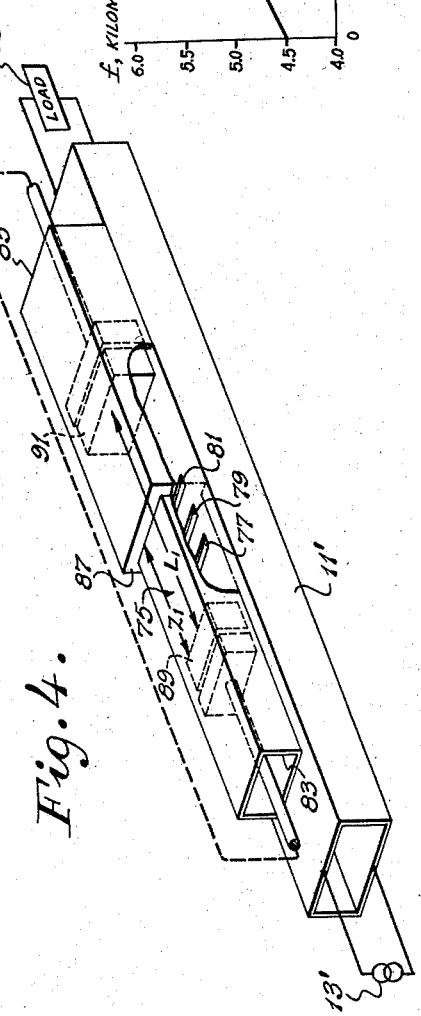
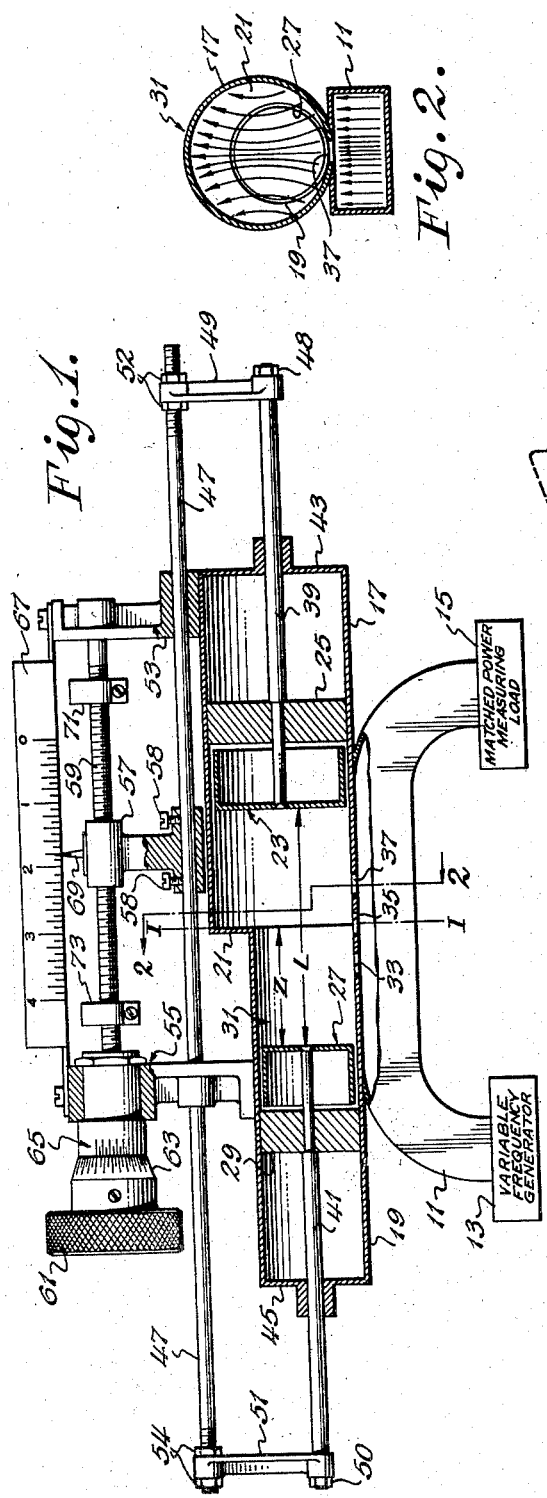
INVENTOR
SEYMOUR B. COHN
BY
Thomas M. Ferrill Jr.
ATTORNEY of Delaware

United States Patent Office
2,819,453
Patented Jan. 7, 1958

2,819,453
MICROWAVE FREQUENCY METER

Seymour B. Cohn, Palo Alto, Calif., assignor to Sperry Rand Corporation, a corporation of Delaware Application March 10, 1954, Serial No. 415,281

8 Claims. (Cl. 333—83)

The present invention relates to tunable microwave resonators. It is particularly concerned with a cavity resonator frequency meter which can be precisely calibrated and reset for determining the frequency of microwave energy with the utmost accuracy.

A plunger-tuned cavity resonator comprising a right circular cylinder operated in the region of 5000 megacycles, for example, requires that the plunger travel approximately .0005 inch for a frequency change of one megacycle. In the region of 50,000 megacycles a .0005 inch movement of the tuning plunger would cause the frequency of the same type resonator to change by approximately 100 megacycles, i. e., at ten times the operating frequency only one-tenth of a predetermined plunger travel is required to change the resonator tuning over a frequency range ten times as wide as that effected by the same plunger travel at the lower frequency.

Standard drive mechanisms for moving a resonator tuning element are of limited precision. As the extent of the plunger travel per megacycle of frequency variation in a cavity resonator frequency meter becomes smaller and smaller relative to the mechanical tolerances and imperfections of the drive mechanism, the resettability of the meter and accuracy of the frequency indication provided thereby becomes more and more limited. The tuning rate (change in resonant frequency per unit displacement of the plunger) is so large for a plunger-tuned resonator for operation in the region of 20,000 megacycles and above, for example, that it has heretofore been impractical to utilize such a resonator as a frequency standard.

Therefore, it is an object of the present invention to provide a cavity resonator having a reduced tuning rate compared to prior art resonators for operation at the same frequencies.

It is a further object of the present invention to provide a plunger-tuned cavity resonator having a less critical tuning response so that the resonator can be employed as part of a frequency meter capable of precise calibration and accurate resettability with standard type plunger drive mechanisms, even at relatively high microwave frequencies.

It is another object of the present invention to provide a resonator as aforedescribed having a substantially linear tuning response over a wide band of frequencies.

The foregoing objects are achieved by constructing a cavity resonator having first and second coupled sections of wave guide having different cut-off frequencies. First and second microwave shorting means are positioned within the first and second wave guide sections, respectively, and the electrical lengths of the shorted portions of the respective wave guide sections between the shorting means are made variable. The cut-off frequencies of the two sections of wave guide and the spacing between the shorting means therein are chosen so that the wave guide region between the shorting means will be resonant at some frequency within a band of frequencies above the cut-off frequencies of the coupled wave guide sections. The electrical lengths of both shorted wave guide portions are variable to alter the ratio of the electrical length of one portion to the other to change the frequency of resonance. The physical distance between the shorting means is kept constant so that the electrical distance therebetween will be 180 degrees or an odd multiple thereof at the various frequencies of resonance in the aforementioned frequency band as the aforementioned electrical length ratio is altered.

Other features and advantages of the present invention will become apparent to those skilled in the art from the detailed description thereof taken in connection with the accompanying drawings in which:

Fig. 1 is a view, partly in section, of a cavity resonator frequency meter in accordance with one embodiment of the present invention;

Fig. 2 is a cross-sectional view of part of the aforementioned cavity resonator frequency meter taken along the lines 2—2 in Fig. 1;

Fig. 3 is a graph of the resonant frequency versus the tuning plunger movement in a frequency meter of the type shown in Fig. 1; and Fig. 4 is a view, partly schematic, of a further embodiment of the present invention utilizing a rectangular shaped resonator as a frequency standard.

Referring to Fig. 1, microwave energy whose frequency is to be measured is supplied to a hollow rectangular wave guide 11 by a variable frequency generator 13 for propagation in the dominant $TE_{10}$ mode. The arrows within wave guide 11 shown in Fig. 2 designate the distribution of the electric vectors of the electromagnetic energy of the aforementioned mode.

Generator 13 comprises any suitable source of microwave energy known in the art for producing microwave oscillations with good power and frequency stability, and may be matched in impedance to wave guide 11 in any conventional manner. Suitable sources of power are discussed in chapter 2 of the book entitled "Technique of Microwave Measurements," volume XI of the Radiation Laboratory Series, copyright 1947 by the McGraw-Hill Book Company, Inc., for example.

Wave guide 11 is terminated in its characteristic impedance by a matched power measuring or indicating load 15. The load 15 may comprise a bolometer or a crystal and any suitable circuit for providing a measurement or an indication of the microwave power in wave guide 11 reaching load 15. Suitable apparatus employing a bolometer for power measurements or indications is shown and described in section 3–2 of the aforementioned volume XI of the Radiation Laboratory Series, for example.

A first open-ended tubular metallic member 17 having a predetermined inner diameter and a second open-ended tubular metallic member 19 of smaller inner diameter are joined together at two of their ends and supported upon the upper wide wall of rectangular wave guide 11. The tubular members 17 and 19 are made eccentric with respect to each other so that regions along their circumferences are tangent with a region along the upper wall of wave guide 11.

The eccentric tubular members 17 and 19 comprise cylindrical wave guide sections having different predetermined cut-off frequencies $fc_{17}$ and $fc_{19}$, respectively. Since these wave guides are joined together in open-ended relationship, the adjacent end openings thereof comprise electromagnetic coupling means to provide a continuous energy passage therebetween. A crescent-shaped metallic member 21 joins the adjacent end of guide section 17 to the adjacent end of guide section 19 as illustrated in Figs. 1 and 2. This member 21 prevents external leakage of energy from guide sections 17 and 19 at their coupling region.

An adjustable metallic tubular plunger 23 is supported within wave guide section 17 for providing a microwave short circuit thereacross. Plunger 23 is conventional in the art, and has an outer diameter slightly less than the inner diameter of guide section 17 and an axial length of approximately one-quarter of the wavelength of the electromagnetic energy in guide sections 17 and 19. The left hand end of plunger 23 is conductively closed and connected to a cylindrical metallic member 25 for concentric alignment with wave guide section 17. Member 25 is supported by the inner wall of tubular section 17 and slidable therealong for adjusting the microwave shorting plane of plunger 23.

A similar microwave shorting plunger 27 of reduced diameter is also provided in wave guide section 19 to provide a short circuit thereacross at the right hand end of the plunger. A cylindrical metallic member 29 is slidably supported within tubular section 19 and connected to plunger 27 for aligning and adjusting purposes. The space between the microwave shorting planes of plunger 23 and plunger 27 within tubular guide sections 17 and 19 comprises a resonant wave guide region or cavity resonator 31.

The resonator 31 is coupled to wave guide 11 by means of three apertures 33, 35 and 37 through the tangential wall portions of resonator 31 and wave guide 11. The center of aperture 35 is located opposite the crescent-shaped member 21. The apertures 33 and 37 are spaced from the center aperture 35 by approximately one-quarter of the wave length of energy in wave guide 11 at the mid-band frequency in the range of frequencies to be measured. When wave guide 11 is operated in its dominant $TE_{10}$ mode the aforementioned apertures cause resonator 31 to be excited in its dominant $TE_{11}$ cylindrical wave guide mode with substantially uniform coupling regardless of the positions of plungers 23 and 27.

The apertures 33, 35 and 37 may be circular, elliptical, or any suitable configuration known in the art for suitably coupling one contiguous wave guide section to another. Only one aperture 35 could be employed in lieu of the three apertures shown, provided it was of the proper size to provide sufficient coupling of microwave energy between the resonator 31 and wave guide 11. Obviously any other suitable coupling means known in the art could be substituted for the aperture means shown in Fig. 1.

Rods 39 and 41 are coupled to cylindrical members 25 and 29, respectively, for providing movements thereof and adjustments of plunger 23 and plunger 27 along their respective wave guide sections 17 and 19. Rods 39 and 41 extend through suitable bearing members 43 and 45, respectively, supported at the opposite ends of the tubular wave guide sections 17 and 19. End sections of the rods 39 and 41 external of the aforementioned wave guide sections are of reduced diameter and threaded so that the plungers 23 and 27 can be rigidly ganged together. Bracket members 49 and 51 and a rod 47 are provided as the ganging means.

Bracket members 49 and 51 are supported, respectively, on the end sections of rods 39 and 41 having reduced diameters, and held in place against the larger parts of the rods by nut members 48 and 50, respectively. The end sections of rod 47 are also threaded so that brackets 49 and 51 can be held in place thereon by a set of nut members 52 and a set of nut members 54, respectively. By employing such an arrangement a fixed distance "L" between plungers 23 and 27 can be set at a required value merely by adjusting one or both sets of nut members 52 and 54 along the rod 47.

The rod member 47 is supported by and slidable within fixed bearing members 53 and 55. Bearing members 53 and 55 are fixedly supported by any suitable means on the outer walls of the tubular sections 17 and 19, respectively.

A bracket member 57 is fixedly supported on rod member 47 by a pair of set screws 58. An aperture through the upper part of member 57 is threaded so that it can be moved by a screw means to adjust the position of rod 47, and the positions of plungers 23 and 27 within guide sections 17 and 19, respectively. The positions of plungers 23 and 27 are changed simultaneously to vary the electrical lengths of the portions of wave guide 17 and wave guide 19 between the plungers while maintaining the fixed distance "L" therebetween.

Screw means comprising lead screw 59 is threaded through the member 57 for axially moving member 57 in response to rotation of the lead screw. Screw 59 is rotatable by knob 61 and is supported for rotation without axial movement in bearing 55 in any conventional manner.

A dial 63 is rotatable with knob 61 to provide suitable indications of the axial movement of member 57 per increment of rotation of knob 61. A dial vernier 65 is fixedly supported on bearing 55 to provide interpolation of the reading on dial 63.

A scale 67 is provided in fixed relationship to resonator 31 to provide an indication of the movement of rod 47 and to resolve cyclic ambiguity of the reading on dial 63. A pointer 69 is fixedly supported on movable member 57 at a proper place relative to scale 67 to indicate the axial distance "Z" between the microwave shorting plane of piston 27 and a transverse plane through line I—I in Fig. 1 at the junction between the adjacent ends of wave guide section 17 and wave guide section 19.

Stop members comprising split nuts 71 and 73 are provided on lead screw 59 to limit the movement of member 57 and, therefore, limit the extreme positions of adjustment of plungers 23 and 27 and the frequency limits between which resonator 31 is adjustable.

Simultaneous movements of the plunger 23 and plunger 27 from positions where the plane of the right-hand end of plunger 27 is at the above-mentioned plane through I—I in Fig. 1, to positions where the left-hand end of plunger 23 is substantially at the plane through I—I will cause the frequency of resonator 31 to vary linearly from a lower frequency limit $f_1$ to a higher frequency limit $f_2$, provided the length "L" of resonator 31 is maintained constant, and $$L = \frac{n \lambda g_{31}}{2}$$

where $\lambda g_{31}$ is a constant value of the composite wave length of the energy in the resonator 31, "$n$" is an integer equal to the number of half wave length at $\lambda g_{31}$ along the resonator axis, and "Z" is the distance from the aforementioned plane through I—I to the right-hand end of plunger 27. If "Z" is equal to zero, the wave length $\lambda g_{17} = \lambda g_{31}$ at a frequency $f_1$; and if "Z" is equal to "L" (the distance between plungers 23 and 27) the wave length $\lambda g_{19} = \lambda g_{31}$ at frequency $f_2$. Since these conditions occur at different frequencies of resonance, the resonator 31 may be varied over a frequency range from $f_1$ to $f_2$ by varying "Z" from zero to a length substantially equal to "L."

If the cut-off frequency of guide section 17 for the dominant $TE_{11}$ mode is $fc_{17} = 3152$ megacycles, and the cut-off frequency of wave guide section 19 for the dominant $TE_{11}$ mode is $fc_{19} = 4302$ megacycles, the following relationships obtain:

$\lambda g_{17} = 3.66$ in. at 4508 megacycles
$\lambda g_{19} = 3.66$ in. at 5370 megacycles Therefore, if "$n$" is equal to the integer 2, "L" in Fig. 1 would be equal to 3.66 inches and the resonator 31 could be tuned from $f_1$ (4.5 kmc.) to $f_2$ (5.37 kmc.). In practice, the resonator 31 would be tunable over some predetermined frequency band between these limits. This is controlled by the positions of stop members 71 and 73 on lead screw 59.

The tuning will be substantially linear as is illustrated in Fig. 3, where the distance "Z" is plotted in inches as an abscissa and the resonant frequency "f" in kilomegacycles (kmc.) as an ordinate. For any condition of resonance of resonator 31 the following equation may be applied as an approximation:

$$\frac{Z}{\lambda g_{19}} + \frac{L-Z}{\lambda g_{17}} = \frac{n}{2}$$

where the letters thereof have the same meanings as aforedescribed. This equation states that if the sum of the electrical phase lengths $\phi_{19}$ and $\phi_{17}$ of the portions of wave guides 19 and 17 between plungers 27 and 23 is equal to an integral multiple of 180 degrees at a particular frequency, the resonator 31 will be resonant at that frequency.

In operation of the aforedescribed arrangement as a frequency meter, variable frequency generator 13 supplies wave guide 11 with energy whose frequency is to be measured. If the resonator 31 is not tuned to the frequency of this energy, substantially all of the power from generator 13 is supplied to the load 15 where the energy is measured or indicated. A minimum amount of energy is absorbed by resonator 31 when it is not tuned to the frequency of the energy from generator 13.

The resonator tuning knob 61 is then adjusted until there is a noticeable dip in power measured or indicated by load 15. At that time, the resonator 31 will be resonant to the frequency of the energy supplied by generator 13, and a significant part of the energy in guide 11 will be transferred to resonator 31 via the coupling apertures 33, 35 and 37. Such an arrangement is usually designated as a "reaction" or absorption" type wavemeter, and operates similarly to the system disclosed in Section 5.13 in the aforementioned volume XI of the Radiation Laboratory Series, for example.

Dial 63, vernier 65, and scale 67 are adapted to indicate the distance "Z" shown in Fig. 1. The resonant frequency of resonator 31 may be determined from these indications by a calibrated chart of resonant frequency versus the distance Z shown in Fig. 1. The graph shown in Fig. 3 is illustrative of the approximate condition of resonance of resonator 31 for the $TE_{112}$ mode of resonance over the aforementioned frequency range from 4508 mc. to 5370 mc.

In the 5000 megacycle operating frequency region, approximately a .00424 inch plunger travel is required to vary the frequency of resonator 31 by one megacycle. At ten times this operating frequency the plunger travel would be approximately one-tenth this amount for a frequency change of ten megacycles. Thus, the increment of plunger travel required in resonator 31 for a predetermined frequency change is of the order of ten times that of prior art constant diameter, plunger-tuned resonators operated over the same frequency range.

An alternative embodiment of the present invention utilizing a rectangular wave guide resonator is illustrated in Fig. 4. In this figure, 13' designates a source of microwave energy which may be similar to the source 13 shown in Fig. 1. Source 13' is coupled to a rectangular wave guide 11' terminated in its characteristic impedance by a load 15' which may be similar to load 15 described in reference to Fig. 1. Wave guide 11' is adapted to operate in its conventional $TE_{10}$ dominant mode.

A rectangular resonator 75 is coupled to the broad wall of wave guide 11' by means of three transverse rectangular slots 77, 79 and 81 in the contiguous broad walls of resonator 75 and wave guide 11'. The centers of the slots 77, 79 and 81 are spaced apart along the wave guide 11' by one quarter of the wavelength of the energy in guide 11' at the mid-band frequency of operation.

The resonator 75 is comprised of two coupled portions of open-ended tubular wave guide sections 83 and 85 of rectangular cross section having different cross-sectional dimensions as shown. The bottom wide walls of wave guide sections 83 and 85 are coplanar and contiguous or tangent with the upper wide wall of rectangular wave guide 11'.

Electromagnetic coupling between wave guide sections 83 and 85 is effected through the adjacent open-ends of these wave guide sections. A conductive element 87 is provided between guide sections 83 and 85 to close off the end portion of guide section 85 which is outward of the adjacent open end portion of guide section 83, thus preventing loss of microwave energy.

Conventional quarter wave length shorting plungers 89 and 91 are provided in wave guide sections 83 and 85, respectively, to provide microwave short circuits in guides 83 and 85 at the planes of the faces of plungers 89 and 91 closest to each other.

The plungers 89 and 91 are ganged together as is schematically shown in Fig. 4, and may be movable by the same type mechanism shown in Fig. 1 for providing movement of plungers 23 and 27. The distance "$L_1$" indicated in Fig. 4 is thus maintained constant, and may be chosen in conjunction with the cut-off frequencies of wave guide sections 83 and 85 so that the resonator 75 will be resonant through a predetermined range of frequencies from "$f_1$" to "$f_2$" by axially moving plungers 89 and 91 in unison from one limit to another. When the resonator 75 is substantially comprised of a portion of wave guide section 85 alone, it is resonant at its lowest frequency. When resonator 75 is substantially comprised of a portion of guide section 83 alone, it is resonant at its highest frequency.

The tuning rate of rectangular resonator 75 will also be substantially linear and at a reduced rate compared to prior art resonators. The operation of the system shown in Fig. 4 and apparatus necessary for providing frequency measurements may be substantially the same as has been described with reference to Fig. 1.

The approximate equation for resonance in the rectangular resonator 75 is:

$$\frac{Z_1}{\lambda g_{83}} + \frac{L_1 - Z_1}{\lambda g_{85}} = \frac{n}{2}$$

where "$L_1$" is the distance between the shorting plungers 89 and 91, "$Z_1$" is the distance from the microwave shorting plane of plunger 89 to the plane of element 87, $\lambda g_{83}$ is the wavelength of microwave energy in the $TE_{10}$ mode in wave guide section 83 at an operating frequency $f_0$, $\lambda g_{85}$ is the wavelength of microwave energy in the $TE_{10}$ mode in wave guide section 85 at the operating frequency $f_0$, and "$n$" is any integer equal to the number of half wavelengths of the energy in resonator 75 along its axis.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. A microwave resonator, comprising first and second electromagnetic wave guide sections having substantially different cut-off frequencies, each of said sections having constant cross-sectional dimensions and extending along a predetermined path for microwave energy, means for electromagnetically coupling a pair of ends of said first and second wave guide sections together, first and second microwave shorting means in said first and second guide sections, respectively, the electrical distance from said first to said second shorting means through said wave guide sections and coupling means being equal to 180 degrees or an integral multiple thereof at a resonant frequency for said resonator within a predetermined band of frequencies above the cut-off frequencies of said wave guide sections, and means for changing the electrical lengths of the por- tions of both said first and said second wave guide sections between said coupling means and respective shorting means in opposite directions to thereby change the resonant frequency at which said electrical distance between said shorting means is equal to 180 degrees or an integral multiple thereof, the physical distance along said path from one to the other of said shorting means being the same at resonance for any frequency within said band of frequencies.

2. A microwave resonator as set forth in claim 1, wherein said first and second shorting means are adapted to be simultaneously movable in opposite directions relative to said coupling means by equal increments relative to said wave guide sections to provide a substantially linear resonant tuning response over said band of frequencies.

3. A microwave frequency meter, comprising a first electromagnetic wave guide section having a first microwave cut-off frequency for a predetermined mode of operation, a second electromagnetic wave guide section having a second cut-off frequency higher than said first frequency for the same mode of operation, said wave guide sections being electromagnetically coupled to each other at adjacent ends, first means within said first wave guide section for providing an adjustable short-circuit therealong, second means within said second wave guide section for providing an adjustable short-circuit therealong, said first and second shorting means being spaced a fixed distance apart to form a microwave resonator, means coupled to said resonator for supplying microwave energy thereto over a frequency range above said first and second cut-off frequencies, and means coupled to said shorting means to provide movements thereof along said wave guide sections for tuning said resonator.

4. A cavity resonator frequency meter, comprising a section of tubular wave guide for propagating electromagnetic energy over a predetermined band of microwave frequencies, a first section of cylindrical wave guide supported adjacent said tubular wave guide, said first section of cylindrical wave guide having a predetermined diameter and cut-off frequency at a predetermined mode of operation, a second section of cylindrical wave guide supported in end to end relationship with said first cylindrical wave guide section and being electromagnetically coupled therewith, said second section of cylindrical wave guide having a smaller diameter than that of said first section and a second cut-off frequency higher than said first cut-off frequency for the same mode of operation, first and second microwave energy shorting means along said first and second wave guide sections, respectively, said shorting means being spaced to define a cavity resonator therebetween, each of said shorting means being adjustable between two limits within each wave guide section for tuning said resonator over a band of frequencies above the cut-off frequencies of said cylindrical wave guide sections, and means coupling said cavity resonator to said section of tubular wave guide.

5. A cavity resonator frequency meter as set forth in claim 4, wherein the axes of said cylindrical wave guide sections are eccentric and regions along the walls thereof are tangential with a wall of said tubular wave guide section.

6. A cavity resonator frequency meter as defined in claim 5, further including means for adjusting said shorting means between said limits and maintaining a constant spacing therebetween, said last-named means being calibrated to provide an indication of the resonant frequency of said resonator at various positions of adjustment between said limits.

7. A microwave resonator, comprising first and second electromagnetic hollow wave guide sections of different cross-sectional dimensions having different cut-off frequencies, the axes of said first and second hollow wave guide sections being eccentric so that a region along the circumference of said first hollow wave guide section is aligned with a region along the circumference of said second hollow wave guide section, means coupling one of said sections to the other, first and second microwave shorting means within said first and second wave guide sections, respectively, said shorting means being spaced apart along said wave guide sections to form a cavity resonator therebetween, means for changing the ratio of the electrical length of the shorted portion of said first wave guide section to the electrical length of the shorted portion of said second wave guide section between said first and second shorting means to thereby tune said cavity resonator to different microwave frequencies, and electromagnetic energy coupling means positioned along said aligned regions of said wave guide sections for supplying said resonator with microwave energy.

8. A microwave resonator, comprising first and second electromagnetic wave guide sections of constant cross-sectional dimensions extending along substantially parallel axes, each of said sections having a different cut-off frequency from that of the other, means coupling one of said wave guide sections to the other at their adjacent ends, means electrically shorting said first and second wave guide sections, respectively, to form a cavity resonator between said shorting means, means for coupling microwave energy into the interior of said resonator, means for changing the electrical length of a portion of at least one of said wave guide sections between said shorting means to thereby tune said resonator to different resonant frequencies, said electrical length varying means including an adjusting mechanism for providing relative movement between said shorting means and wave guide sections along said axes, and means for maintaining a fixed distance between said shorting means to provide a substantially linear resonator tuning response over a predetermined band of frequencies.

References Cited in the file of this patent

UNITED STATES PATENTS

| | | |
|---|---|---|
| 2,423,506 | Landon | July 8, 1947 |
| 2,460,090 | Kannenberg | Jan. 25, 1949 |
| 2,525,554 | Latimer | Oct. 10, 1950 |
| 2,694,186 | Kinzer et al. | Nov. 9, 1954 |